(12) United States Patent
Gringoire et al.

(10) Patent No.: US 9,133,369 B2
(45) Date of Patent: Sep. 15, 2015

(54) COATED POLYMERIC FILM

(75) Inventors: Bruno R. Gringoire, Rachecourt (BE);
Thierry J. Dabadie, Luxembourg (LU);
William J. Grisard, Marville (BE);
Daniel L. Hinman, Farmington, NY (US)

(73) Assignee: JINDAL FILMS AMERISCAS LLC

( * ) Notice: Subject to any disclaimer, the term of this patent is extended or adjusted under 35 U.S.C. 154(b) by 347 days.

(21) Appl. No.: 13/519,062

(22) PCT Filed: Dec. 14, 2010

(86) PCT No.: PCT/US2010/060308
§ 371 (c)(1),
(2), (4) Date: Jul. 24, 2012

(87) PCT Pub. No.: WO2011/100029
PCT Pub. Date: Aug. 18, 2011

(65) Prior Publication Data
US 2012/0282447 A1    Nov. 8, 2012

Related U.S. Application Data

(60) Provisional application No. 61/303,759, filed on Feb. 12, 2010.

(51) Int. Cl.
| *B32B 27/14* | (2006.01) |
| *C09J 7/02* | (2006.01) |
| *C08J 7/04* | (2006.01) |
| *C08L 23/08* | (2006.01) |
| *C09D 133/06* | (2006.01) |
| *C09J 123/08* | (2006.01) |
| *C08K 3/34* | (2006.01) |

(52) U.S. Cl.
CPC ............... *C09J 7/0296* (2013.01); *C08J 7/045* (2013.01); *C08J 7/047* (2013.01); *C08L 23/0869* (2013.01); *C09D 133/06* (2013.01); *C09J 123/0876* (2013.01); *C08J 2323/12* (2013.01); *C08J 2433/02* (2013.01); *C08K 3/34* (2013.01); *C08L 2312/00* (2013.01); *C09J 2203/334* (2013.01); *C09J 2205/106* (2013.01); *C09J 2423/006* (2013.01); *Y10T 428/24975* (2015.01); *Y10T 428/252* (2015.01); *Y10T 428/254* (2015.01)

(58) Field of Classification Search
CPC ........... B32B 27/14; C08J 7/047; C08J 7/045; C09D 133/06; Y10T 428/254; Y10T 428/252; Y10T 428/24975
USPC .................... 428/212, 216, 325, 327; 427/209
See application file for complete search history.

(56) References Cited

U.S. PATENT DOCUMENTS

| 3,793,244 | A | * | 2/1974 | Megee et al. ................. 524/447 |
| 5,380,587 | A | | 1/1995 | Musclow et al. |
| 5,382,473 | A | | 1/1995 | Musclow et al. |
| 5,662,985 | A | | 9/1997 | Jensen et al. |
| 5,776,604 | A | * | 7/1998 | Lu et al. ........................ 428/343 |
| 5,789,123 | A | | 8/1998 | Cleckner et al. |
| 6,844,034 | B2 | | 1/2005 | Touhsaent |
| 2007/0248810 | A1 | | 10/2007 | McGee et al. |

FOREIGN PATENT DOCUMENTS

| EP | 0 782 932 | 7/1997 |
| EP | 0 878 320 | 11/1998 |

* cited by examiner

*Primary Examiner* — Aaron Austin
*Assistant Examiner* — Lawrence Ferguson

(57) ABSTRACT

A polymer film that includes a polymeric substrate having a first side and a second side; a back-side coating on the first side of the substrate, the back-side coating formed from at least an ionomer, an acrylic emulsion, and at least one inorganic material, said inorganic material comprising a majority of particles have a mean largest dimension in the range of 0.2 µm to 25 µm; and a polymeric surface layer in contact with the second side of the polymeric substrate is described. Articles, such as labels, and methods of making films and labels are also described.

21 Claims, 1 Drawing Sheet

COATED POLYMERIC FILM

CROSS REFERENCE TO RELATED APPLICATIONS

This application claims priority to and the benefit of U.S. Ser. No. 61/303,759, filed Feb. 12, 2010 and PCT/US2010/060308, filed Dec. 14, 2010, the disclosures of which are is incorporated herein by reference in their entirety.

FIELD OF THE INVENTION

This invention relates to two-side coated composite films and labels, and preferably to pressure sensitive labels. The invention particularly relates to printable, two-sided, coated polymer-based films and labels that are resistant to blocking while providing robust adherence to adhesives and resistance to moisture.

BACKGROUND

Many untreated or uncoated polymeric films, such as films made from isotactic polypropylene, may not provide for acceptable adherence of inks or adhesives without special treating or coating. Coating and treating polymer films greatly improves their usefulness and functionality. However, when both sides of a film are treated and/or coated to increase surface energy, severe interfacial blocking problems can arise when the film is rolled or stacked. To be useful, processable, and functional, a topside surface of a polymer film should not block to a back-side surface.

In polymer films useful for labeling applications, it is desirable that a film is suitably printable on one surface of the film, while the other surface of the film suitably bonds with an adhesive that is useful for attaching the film or label to a container. Solutions to the blocking problem commonly provide for printing and applying an adhesive to the same surface. Thereby, only one surface of a film need possess an increased surface energy, thus controlling or avoiding blocking problems. To avoid blocking problems, films prepared for use as label facestock, particularly pressure sensitive facestock, may be coated on one surface with a coating that enhances printability, adhesion, mar resistance, and/or pasteurization resistance. The opposite side of such facestock film may be untreated.

Alternatively, some label facestock has a treated or coated topside surface for receiving printing inks but do not include a treatment or coating on the adhesive-receiving surface (for example, Clear PSA4 manufactured by ExxonMobil Oil Corporation). A printer or converter may later corona-treat the adhesive-receiving surface immediately before applying an adhesive and a release liner to the facestock.

Label facestocks that provide a limited but acceptable degree of blocking possess a print-side/top-side coating and a treated but uncoated adhesive-receiving/back-side surface. Treatment of the adhesive-receiving surface by flame or corona discharge may be used on the adhesive-receiving side to render the uncoated plastic surface receptive to adhesives. For example, U.S. Pat. Nos. 5,380,587 and 5,382,473 to Musclow, et al. disclose a multilayer packaging or label stock films having excellent printability and non-blocking characteristics to a treated, but uncoated, polyolefin surface. Such films may be challenging and rigorous to produce. Treatment has to be carefully controlled in order to prevent blocking or fitness for use problems. Too much treatment can generate blocking problems. Too little treatment would make the film not fit for use and require converter re-treatment. Film flatness must be well controlled as well as some variability can generate high pressure areas prone to create blocking.

US 20070244880 discloses coated polymer films comprising a polymeric substrate including a first side and a second side; a back-side coating on the second side of the substrate, the back-side coating comprising an ionomer; particles of a colloidal mineral, a majority by weight of the colloidal mineral particles having an overall mean diameter of no greater than about 0.1 micron; and a front-side coating on the first side of the substrate, wherein the front-side coating is printable.

Nevertheless, the polymeric labeling industry still needs an opaque film with robust adhesive anchorage and that has acceptable resistance to blocking to a printable topside coating, particularly over a wider range of exposure times to high temperature and high humidity conditions. Moreover, there is a need to provide such a film having a low carbon footprint and a method of making such a film, the method also having a low carbon footprint.

SUMMARY

In one aspect, embodiments of the invention provide a polymer film comprising: a) a polymeric substrate having a first side and a second side; b) a back-side coating on the first side of the substrate, the back-side coating formed from at least an ionomer, an acrylic emulsion, and at least one inorganic material, said inorganic material comprising a majority of particles having a mean largest dimension in the range of 0.2 μm to 25 μm; and c) a polymeric surface layer in contact with the second side of the polymeric substrate. In particular embodiments, the back-side coating further comprises a first cross-linking agent.

In some embodiments, the invention provides polymer film comprising: a) a polymeric substrate including a first side and a second side; b) a back-side coating formed from at least 1) an ionomer comprising from about 65 wt % to about 95 wt % of units derived from ethylene and from about 5 wt % to about 35 wt % of units derived from acrylic acid, the wt % being based on the total weight of the ionomer, 2) an acrylic emulsion, 3) a cross-linking agent, and 4) at least one inorganic material, said inorganic material comprising a majority of particles having a mean largest dimension ranging from 0.2 μm to 25 μm; c) a primer positioned between the first side of the polymeric substrate and the back-side coating; and d) a printable front-side layer in contact with the second side of the polymeric substrate, the front-side layer comprising a cationic polymer including at least one cationic acrylate polymer or copolymer, a cross-linking agent, cross-linking catalyst, an adhesion promoter comprising acetoacetoxyethylmethacrylate, and a second inorganic material comprising at least one clay or silica comprising particles having a mean largest dimension ranging from about 2 μm to about 5 μm.

In another aspect, embodiments of the invention provide labels incorporating such films.

In another aspect, embodiments of the invention provide a method of preparing a film, the method comprising: coating a first side of a polymeric substrate with a printable front-side coating composition; and coating a second side of the polymeric substrate with a primer having a back-side coating composition thereon, the back-side coating comprising an ionomer, an acrylic emulsion, and at least one inorganic material, said inorganic material comprising particles having a mean largest dimension in the range of 0.2 μm to 25 μm.

DETAILED DESCRIPTION OF THE INVENTION

Figure 1:
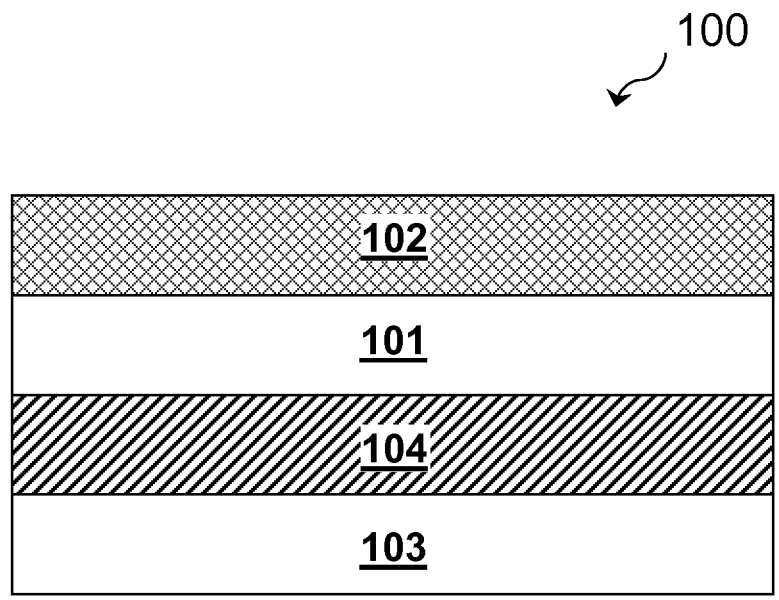
FIG. 1 illustrates a schematic representation of a film according to an embodiment of the invention.

In one aspect, this invention provides a two-side coated film or polymeric substrate that is printable and has improved resistance to blocking, particularly in hot humid environments. Preferably, the film is an opaque film, but use of other substrates, such as clear or matte polymer films, metal layers, and/or paper layers are within the scope of the invention. In another aspect, the coated film is useful as a label film, a packaging film, and/or a graphic-supporting film. More particularly, in still another aspect, films of this invention may be suitable for use as a label facestock film that may be suitable for use as an adhesive label, such as with pressure sensitive labeling or hot melt roll labeling. For example, after printing, applying adhesive, and applying the label facestock to a container or object, the label can withstand rigorous surface agitation and environmental challenges such as water-bath immersion without adversely affecting the print, adhesion, or clarity. Moreover, adhesives, especially pressure-sensitive adhesives and removable pressure-sensitive adhesives, should remain well anchored to the adhesive-receiving, back-side coating under such conditions. In particular embodiments, when the label facestock is removed or repositioned on a release liner or other surface, such as a product or product container, the glue or adhesive will tend to remain adhered to the label facestock and not another surface. Further, rolls of label facestock according to the present invention can be exposed to a broad range of temperatures, including temperatures greater than 40° C., without unacceptable blocking.

Preferred embodiments of this invention may provide an opaque label facestock film having improved performance, aesthetic, and optical properties as compared to prior art clear label facestock films. While preferred embodiments are designed for the rigorous requirements of clear labels, the back-side coatings of this invention could easily be adapted for use with clear polymer films to provide two-side coated, non-blocking embodiments of such films. Such versatility may facilitate improved material utilization and production efficiencies during converting and manufacturing by reducing the amount of inventory, cleaning, and component replacements needed between product changeovers.

In one aspect, embodiments of the invention provide a polymer film comprising: a) a polymeric substrate including a first side and a second side; b) a back-side coating comprising on the first side of the substrate, the back-side coating formed from at least an ionomer, an acrylic emulsion, and at least one inorganic material, said inorganic material comprising particles having a mean largest dimension ranging from 0.2 to 25 µm; and c) a polymeric surface layer in contact with the second side of the polymeric substrate. In particular embodiments, the back-side coating further comprises a first cross-linking agent.

In another aspect, embodiments of the invention relate to labels suitable for labeling an article, wherein the label comprises a film according to an embodiment of the invention. In some embodiments, the label is applied to an article.

In yet another aspect, embodiments of the invention relate to methods of preparing a film, the method comprising: coating a first side of a polymeric substrate with a printable front-side coating composition; coating a second side of the polymeric substrate with a back-side coating, optionally including a primer, to produce a film according to an embodiment of the invention.

FIG. 1 illustrates a film structure 100 in accordance with an embodiment of the invention. The film structure 100 includes a polymeric substrate (i.e., core layer) 101, a polymeric surface layer 102 in surface contact with one side of the polymeric substrate 101; and a backside coating layer 103 in surface contact with the opposite side of the polymeric substrate 101. In the embodiment shown in FIG. 1, the backside coating layer 103 includes an optional primer layer 104.

Figure 2:
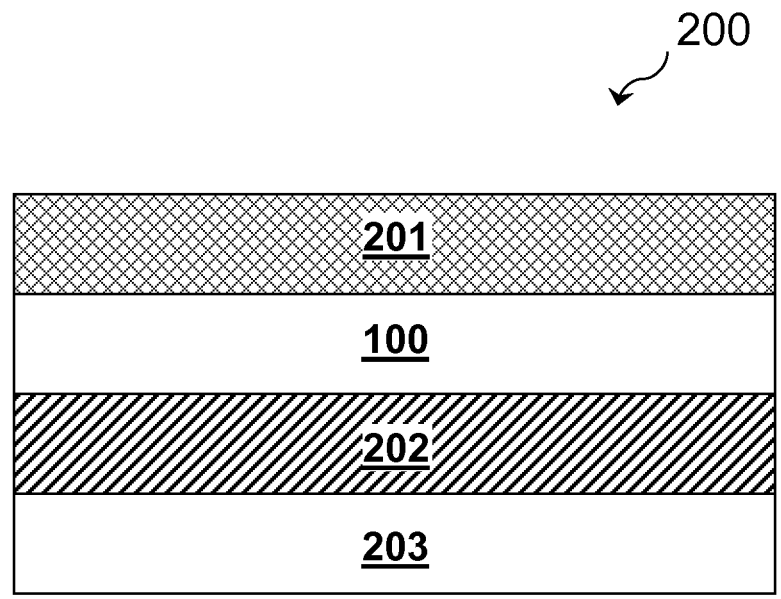
FIG. 2 illustrates a schematic representation of a label structure according to an embodiment of the invention.

FIG. 2 illustrates a label structure 200 formed from a film structure 100. The film structure 100 has an ink layer 201, preferably a UV ink layer, formed on at least a portion of one surface. A pressure sensitive adhesive layer 202 on an opposite side of the film structure 100 adheres the film structure 100 to a release liner 203, typically a siliconized release liner.

A detailed description of the components of embodiments of the film structure 100 and label structure 200 are now described.

Polymeric Substrate

Polymeric substrates referred to herein generally include two opposing sides or surfaces. One surface of the substrate is referred to as, e.g., a top-side, front-side, or print-side of the substrate and is the side that is typically opposite the side of the substrate that is adjacent the article when the substrate is used as a label or opposite a side of the substrate that is adjacent a product when the substrate is used as a packaging substrate. The other surface of the substrate may typically be referred to as the back-side, e.g., an adhesive-receiving side, of the substrate and is typically the side of the substrate that is adjacent the article, product, or the side of the substrate that receives the labeling adhesive when the substrate is used to form a label.

The term "polymeric substrate" or "substrate" as used herein may be defined broadly to include any polymer or thermoplastic material comprising one or more monomers as a component thereof, preferably oriented polymeric film structures. The polymeric substrate may be monolayer or multilayer films, including oriented, coextruded, and laminated multilayer films, and may preferably be biaxially oriented films. The polymeric substrate may also comprise other non-thermoplastic or non-polymeric materials, such as paper, cardstock, and/or metallic or nonmetallic substrates, and/or they may be laminated to such non-thermoplastic materials, such as paper, metallic, or non-metallic substrates. The polymeric substrate includes the polymeric portion plus any non-thermoplastic components that make up the structural composition of the substrate. The polymeric substrate may include any clear, matte, cavitated, or opaque film. Many preferred embodiments may comprise an opaque or white film with substantially non-matte surfaces.

In some embodiments the preferred polymeric substrate is a polyolefin film and more preferably a biaxially oriented, multi-layer or monolayer polyolefin-based film comprising polypropylene, polyethylene, and/or polybutylene homo-, co-, or ter-polymers. Other thermoplastic substrates or layers may also be present within such film embodiments, such as polyesters. However, in other embodiments, the polymeric substrate can include substantially any thermoplastic material that forms a thin film that can be employed for packaging, labeling, or decoration. Other exemplary suitable materials may include nylon, polyethylene terephthalate, polylactic acid, and polycarbonate. The contemplated substrates also include coextrudates of the foregoing materials, laminates of any two or more of these materials or interblends of any of the materials extruded as a single base film. Polyolefin homopolymers and copolymers of propylene and ethylene may be most useful in many labeling applications. One particularly preferred polymeric substrate that is suitable as a facestock for labeling is a polypropylene-based film containing at least 80 wt % of isotactic polypropylene in at least a primary or core layer. Exemplary commercially available materials include Exxon 4252 and FNA 3371.

The polymeric substrate may be coextruded with at least one skin layer or it may be laminated to at least one other film. Typically, when the film is coextruded the thickness of a skin layer may range from about 2% to about 18% of the total film thickness. Multilayer films having three or more layers, e.g., five layers and sometimes even seven layers, are contemplated. Five-layer films may include a core layer, two skin layers, and an intermediate layer between the core layer and each skin layer, such as disclosed in U.S. Pat. Nos. 5,209,854 and 5,397,635. The skin layers may include a copolymer (i.e., a polymer comprising two or more different monomers) of propylene and another olefin such as ethylene and/or 1-butene.

Another exemplary preferred substrate is a multilayer polypropylene film comprising at least one of polyethylene, polypropylene, copolymer of propylene and ethylene, copolymer of ethylene and 1-butene, terpolymers of any of the foregoing and maleic anhydride modified polymers. Another useful substrate comprises polypropylene interblended with a minor proportion of at least one of polyethylene, copolymers of ethylene and an alpha olefin, copolymers of propylene and an alpha olefin, terpolymers of olefins and maleic anhydride modified polymers. Multilayer, white opaque, cavitated polypropylene-based films may also be a useful substrate. Such films are described in U.S. Pat. Nos. 4,758,462; 4,965,123; and 5,209,884.

The polymeric substrate may also be treated and/or metallized on at least one side. Many preferred polypropylene polymer-film embodiments may be treated on both sides to improve adherence of the print-side coating and the adhesive to the adhesive-receiving surface. Treatment may typically comprise corona, plasma, or flame treatment. In some embodiments, treatment may also comprise applying a primer to a surface of the polymeric substrate to improve adhesion between the substrate and the back-side coating and/or the polymeric surface layer. Such treatments may facilitate uniform wetting of the coatings and/or increase surface energy to improve coating anchorage to the substrate. The surface treatment typically may be applied after orientation, "in-line" on the coating equipment, though primers may typically be applied using coating equipment. Some embodiments may possess skin layers that do not require surface treatment for acceptable coating, ink, or adhesive adherence, such as layers comprising copolymers of ethylene and/or homopolymers of polyethylene, e.g., medium or high density polyethylene. Metallization may be by vacuum deposition of aluminum or other metals. A print-face coating and printing ink may also be applied to the metallized or treated surface.

The polymeric substrates may be uniaxially oriented, or simultaneously or sequentially biaxially oriented. A typical range of orientation stretches the film 4 to 10 times its original dimension in the machine direction and 7 to 12 times its original dimension in the transverse direction. The thickness of oriented polymeric substrates is not critical and typically ranges from about 10 μm to about 100 μm.

Back-Side Coating

Films according to the present invention also include a back-side coating on a second side, i.e., the back-side, of the polymeric substrate. Although it is not required, a back-side coating generally serves as to receive an adhesive coating and/or to prevent blocking with the printable front-side coating and/or inks. The back-side coating comprises at least an ionomer component, an acrylic emulsion, and an inorganic material. Optionally and often preferably, the back-side coating also comprises a cross-linking agent to cross-link the ionomer and acrylic emulsion component.

Ionomer

According to IUPAC provisional nomenclature recommendations, an ionomer is a polymer in which a small but significant proportion of the constitutional units have ionic or ionizable groups or both. Some suitable ionomers are copolymers comprising from about 50 wt % to about 98 wt %, based on the total weight of the ionomer, of one or more carbonyl-free monomers selected from the group consisting of styrene, methyl styrene isomers, halogenated styrene isomers, vinyl chloride, vinylidene chloride, butadiene, acrylonitrile, methacrylonitrile, ethylene, propylene, and butylene isomers; and from about 50 wt % to about 2 wt % of one or more of the group consisting of acrylic acid, methacrylic acid, crotonic acid, maleic acid, and itaconic acid.

Some useful ionomers useful in the layers and coating of the invention include copolymers comprising: from about 65 wt % to about 95 wt % of units derived from at least one of ethylene, propylene, and butylene; and from about 5 wt % to about 35 wt % of units derived from at least one of acrylic acid, methacrylic acid, crotonic acid, maleic acid, and itaconic acid, based on the total weight of the ionomer. Particular ionomers include copolymers comprising from about 65 wt % to about 95 wt % of units derived from ethylene and from about 5 wt % to about 35 wt % of units derived from acrylic acid based on the total weight of the ionomer. Michem® Prime 4983R, available from Michelman Inc., Cincinnati, Ohio, is an example of a suitable ionomer and is a polymer dispersion comprising ethylene acrylic acid in aqueous ammonia. In some preferred embodiments, the ionomer comprises from about 5 wt % to about 30 wt %, more preferably 10 wt % to 20 wt % of the weight of the back-side coating, based on the total weight of the back-side coating of the film.

Any suitable amount of ionomer may be used. In particular embodiment, the backside coating comprises about 2 wt % to 60 wt %, particularly, 5 wt % to 60 wt %, more particularly about 10 wt % to 50 wt %, ionomer, based on the total weight of the backside coating.

Acrylic Emulsion

The acrylic emulsion typically comprises unsaturated carboxylic acid-based and/or ester-based polymers. In particular embodiments, the backside coating is formed from 20 wt % to 80 wt %, particularly 25 wt % to 65 wt %, more particularly 30 wt % to 50 wt % of the acrylic emulsion.

Carboxylic acid groups can participate to cross-linking reactions. A preferred acrylic emulsion is Neocryl XK90 sold by DSM Neoresins, Waalwijk, The Netherlands. This is an iminated acrylic emulsion with a TG at 3° C. and showing remarkable compatibility with other backside coating components.

Cross-Linking Agent

In some preferred embodiments, one or more layers of the film, particularly back-side coatings, e.g., adhesive-receiving back-side coatings, include at least one cross-linking agent, preferably a carboxyl-reactive cross-linking agent. Exemplary carboxyl-reactive cross-linking agents may include coordinating metal compounds, aziridine, aminomethylol, alkylated aminomethylol, isocyanate, blocked isocyanate, epoxy, melamine-formaldehyde, oxazoline, and silane derivatives. The cross-linking agent may be provided at a level that is sufficient to cross-link from about 5% to 35% of the acid groups present. A more preferred range may be to cross-link from about 10% to about 30% of the acid groups. A still more preferred range for the cross-linking agent would be an amount sufficient to cross-link from about 15% to about 25% of the acid groups. Preferred carboxyl-reactive cross-linking agents may include ammonium zirconium carbonate (AZCote® 5800M manufactured by Hopton Technologies, Inc., Rome, Ga.) and poly-functional aziridine (CX100™ made by DSM NeoResins, Waalwijk, The Netherlands). In still other embodiments, the ionomer and/or acrylic emulsion used in the back-side coating may be self-cross-linking.

Inorganic Material

The inorganic material preferably comprises a dispersion of clays having mean largest dimension of having a 0.2 µm to 25 µm, particularly 1.0 µm to 10.0 µm or 0.2 micron (200 nm) and 1.0 micron (1000 nm) (e.g., kaolinite clays such as Lithosperse® 7015 HS and 7005 CS by Huber Engineering Minerals).

Other inorganic materials may comprise a particulate dispersion of at least one of silica (Syloid W500 and W900 grades from Grace Davison—those grades are specially designed for water based coatings), alumina, titanium dioxide, calcium carbonate, sodium magnesium fluorosilicate, synthetic sodium hectorite, white bentonite, montmorillonite, alkaline polyphosphate, talc, alkaline silicate salts, water glass (salts of potassium, lithium, and/or sodium, such as sodium silicate), surface-modified silica, surface-modified alumina, surface-modified titanium dioxide, surface-modified calcium carbonate, surface-modified talc and mixtures thereof. Exemplary suitable alkaline polyphosphates may include at least one of tetrasodium pyrophosphate, sodium hexametaphosphate, sodium tripolyphosphate, disodium acid pyrophosphate, hexasodium tetra-polyphosphate, and tetrapotassium polyphosphate, including mixtures thereof.

The inorganic material is typically present in an amount from about 10 wt % to about 70 wt %, particularly about 30 wt % to about 60 wt % (e.g., 35 wt % to 50 wt %) where the inorganic material is a clay, particularly about 10 wt % to 30 wt % where the inorganic material is a silica.

Optional Components of the Back-Side Coating

The adhesive-receiving, back-side coatings described herein may also include one or more additional components, such as coating-process facilitating adjuvants, nonionic wax dispersions, anionic wax dispersions, nonionic slip additives. Usage of such additives, some of which are further discussed below, may be known to those skilled in the art.

Coating-process facilitating adjuvants include materials that may aid the coating process, such as defoamers, wetting agents, and lubricants. Also, high-speed application of some coating formulations can sometimes generate foam. A defoamer such as Cognis Foamaster 223 based on mineral oil, typically at a concentration of about 50 to 100 ppm, is desirable to control foaming.

Nonionic or anionic wax emulsions may also improve blocking resistance and/or lower the coefficient of friction. For example, an emulsion of Michem® Lube 215, produced by Michelman, Inc., may be compatible with the back-side formulation of this invention, if needed. Typically, however, such materials are unnecessary.

According to some preferred embodiments, a functional label may be prepared from the two-side coated film according to this invention (a label facestock), by applying an adhesive to the coated, adhesive-receiving side of the film. The label facestock according to this invention may be coated with a pressure-sensitive adhesive or a pressure-sensitive adhesive may be transferred to the coated adhesive-receiving surface from a combined release liner. Alternatively, a releasing film or sheet consisting of a releasing agent can cover such pressure-sensitive adhesive layer when the adhesive layer is applied to the label facestock.

Polymeric Surface Layer

The polymeric surface layer on the polymeric substrate may serve any function. Where the polymeric surface layer is a printable layer is may be referred to as a front-side layer. Thus, in particular embodiments the polymeric surface layer is a printable, front-side layer. The layer need not actually be printed. In such embodiments, the polymeric substrate should have a layer or coating having sufficient surface energy that, if printing is desired, should provide acceptable adherence and appearance for a printing ink. For reference purposes, the front-side surface of the polymeric substrate may be referred to herein as a "print-side," or "print layer" even though that side may not actually be printed. A "printable" coating or layer may be defined as any coating or layer for which a printing method could be used to apply printing ink upon such coating, after the coating is dried or cured, such as by screen printing, letterpress, offset, flexographic, gravure, laser, or ink jet. Printing inks may include one- and two-component inks, oxidatively-cured inks, and radiation-cured inks, aqueous- or solvent-based dissolved inks, aqueous- or solvent-based dispersed inks, and 100% ink systems. Such surface may be considered printable if it passes tests related to each of (i) ink adhesion and (ii) inking quality.

With respect to the ink adhesion test, the print-side may be considered printable if three repeated pulls of testing tape applied to the coated front-side of the polymeric substrate (Scotch® 810 made by 3M, St. Paul, Minn., or the equivalent) does not remove more than 50% of the ink or metal, after the ink or metal is completely dried, cured, and/or conditioned for the intended use.

Preferred printable coatings for the first side of the polymeric substrate provide excellent anchorage for inks, including radiation curable inks, such as ultra-violet ("UV") radiation cured inks, and many other types of inks such as discussed below. To provide a durable, scratch resistant, or mar resistant print-surface on the film, many preferred embodiments are coated with a coating that offers such properties, such as cross-linked or cured coatings. Preferred coating embodiments may also resist attack by isopropyl alcohol (IPA) and hot water. Examples of such coatings are described by McGee in U.S. Pat. No. 6,893,722, Touhsaent in U.S. Pat. No. 6,844,034, and Servante in U.S. Patent Application No. 2005/0112334. These patents and application are incorporated herein, by reference, in their entirety. In many preferred pressure sensitive label embodiments, the coatings described by McGee in U.S. Pat. No. 6,893,722 may be especially preferred, as they may provide a durable, pasteurizable, printable, front-side for the inventive polymer film. Other suitable front-side coatings may include acrylic-based coatings and other water- or solvent-based printable coatings that are substantially clear when dry. The front-side coatings may be applied by any means known in the art, such as direct gravure, reverse-direct gravure, offset, spraying, or dipping.

Primer

In some circumstances it may be advantageous to apply a primer to one or both sides of the substrate before applying the polymeric surface layer and/or the back-side coating. Thus, while the primer may be applied in a separate step than the back-side coating and/or the polymeric surface layer, where a primer is present it should be considered part of the respective back-side layer or polymeric surface layer. Generally, any primer layer commonly used in the art, could be used and included in films according to this invention, so long as the chosen primer bonds adequately to the polymeric substrate and coating formulation when exposed to conditions of intended use, such as hot water. Exemplary primers may include water-based epoxies prepared and applied according to Steiner, et al. in U.S. Pat. No. 4,214,039 and cationic amino-functional polymers described by McGee in U.S. Pat. No. 6,596,379. Other specific examples may include amino-functional acrylics such as NeoCryl™ XK-90 or water-based urethanes like NeoRez R-610, manufactured by DSM Neo-Resins (Waalwijk, The Netherlands). Preferred embodiments, however, do not require a primer layer on either surface of the polymeric substrate. Generally, inclusion of primers in the structure could unnecessarily add cost and increase product complexity. If used, primer layers should be relatively thin, with application levels yielding between about 0.05 g/m$^2$ and 1.0 g/m$^2$ of dried primer. A more preferred range for primers may be between 0.1 g/m$^2$ and 0.5 g/m$^2$.

Some suitable primers for use in embodiments of the invention include an iminated acrylic, a poly(ethyleneimine), an epoxy or a polyurethane Where the primer composition includes a cross-linking agent, any cross-linking capable of cross-linking the ionomer to a desirable degree may be used. Particularly suitable cross-linking agents comprise a carboxyl-reactive functionality. Thus, in some embodiments, at least one of the first and second cross-linking agents comprises a carboxyl-reactive cross-linking agent the amount of cross-linking is not critical; however, in some embodiments about 5 wt % to about 35 wt % of the acid groups are cross-linked.

In particular embodiments, the films according to the invention comprise: a) a polymeric substrate including a first side and a second side; b) a back-side coating formed from at least 1) an ionomer comprising from about 65 wt % to about 95 wt % of units derived from ethylene and from about 5 wt % to about 35 wt % of polymer units derived from acrylic acid, 2) an acrylic emulsion, 3) a cross-linking agent, and 4) at least one inorganic material, said inorganic material comprising particles having a mean largest dimension ranging from 0.2 to 25 µm; c) a primer positioned between the first side of the polymeric substrate and the back-side coating; and d) a printable front-side layer in contact with the second side of the polymeric substrate, the front-side layer comprising a cationic polymer including at least one cationic acrylate polymer or copolymer, a cross-linking agent, cross-linking catalyst, an adhesion promoter comprising acetoacetoxyethylmethacrylate, and a second inorganic material comprising at least one silica, natural clay, or synthetic clay comprising particles having a mean largest dimension ranging from about 2 µm to about 5 µm.

Test Methods for Examples
One-Hour Blocking Test

This test involves matching various combinations of printable coated surfaces (e.g., top-sides or front-sides) with coated adhesive-receiving surfaces (e.g., back-sides). Six-inch long by two-inch wide test samples are placed between a pair of 2-inch by 4-inch (50 mm by 100 mm) chrome-faced metal plates that are 0.25 inches (~6 mm) thick. Sample portions that extend beyond the plates provide space for sample identification. Each sample (comprising two pieces of film with a printable or tops-side surface facing an adhesive-receiving or back-side surface) has annealed aluminum foil (0.001-inch thick) above and below it. The foil prevents pairs of test samples from sticking together. If exterior surfaces of a test pair have coating(s) comprising ionomer, as is the case with the adhesive-receiving layer according to this invention, a piece of 70 SPW (manufactured by ExxonMobil Films) polymer film is placed between the test pair and the foil (treated surface toward the foil) to prevent the ionomer from blocking to the foil. A stack containing up to 48 pairs of test samples (interleaved with aluminum foil and 70 SPW) can be placed between the metal plates.

The plates containing the stack of test samples are placed into a Carver Press, Model C (Carver, Inc., Wabash, Ind.) equipped with temperature controlled platens. Tests are normally conducted at the warm temperature of either 60° C. or 52° C. When the plates have been centered on the platens of the press, force is applied to produce 6000±200 lb of force between the platens. Since the surface area of the samples is 8 in$^2$ (~52 cm$^2$), the effective pressure on the samples is about 750±25 psi (52±1.76 kg/cm$^2$). This pressure is held constant for one hour. After the prescribed time, the pressure is relieved and the warm samples are removed (using proper protective equipment) and separated by carefully peeling the foil away from each test pair. The slip film (e.g., 70 SPW), if used, is not removed from the test pair. The samples typically cool quickly after separation from the foil.

Each test pair can then be mounted into the jaws of a Sintech Tensile Tester (made by Instron, Norwood, Mass.), that is set for a cross-head speed of 5 in/min to peel the adjacent layers of each sample set apart and determine blocking effects, if any. During the peel, the operator should hold the sample at about 90° to the peel direction. For each test, the cross-head travels two inches, but to avoid edge effects, the software only bases its calculations on data gathered for separation distances between 0.25 (6.3 mm) and 1.9 inches (48.3 mm) from the leading edge.

Pressure Sensitive Adhesive Evaluation

Interactions between back-side coating and different types of pressure-sensitive adhesives may be either evaluated by internal ExxonMobil lab or by independent parties, such BASF in Ludwigshaffen in Germany and MacTac in Soignies in Belgium. Samples may be tested with proprietary blends of repositionable (shelf-marking) adhesive, permanent solvent and water based adhesive, removable adhesive and hot melt adhesive.

The test method involves applying an adhesive to a release liner, followed by transfer-coating the test adhesive to the adhesive-receiving, coated surface of the sample polymeric substrate to be evaluated. The adhesive coating weight is typically about 20±1 g/m$^2$. After peeling away the release liner, the adhesive coated sample is then attached to a test surface (e.g., stainless steel, aluminum, or glass). After conditioning, the peel force required to remove the sample label from the test surface is recorded and the mode of failure noted. It is usually desirable for the adhesive to remain with the facestock after removal. It is also usually desirable for the adhesive to separate from the test surface without "legging." Legging describes the tendency for an adhesive to form elastic filaments or threads when the adhesive is separated from another surface.

EXAMPLES

Comparative Example 1

A white opaque cavitated oriented polypropylene film (available as grade 60LH247 from ExxonMobil Chemical Films Europe) having skin layers formed from EPB terpolymer resin (available as Adsyll 5C39 F from Basell) having about 3.25% C2 and 6% C4 is used as the polymeric substrate. A backside coating comprising 72 wt % of kaolinite clay Lithosperse® 7005 CS (available from Huber Engineering Minerals) and 28 wt % of cationic acrylic copolymer R1117XL (available from OSP, Owensboro Ky.) is applied to one side of the polymeric substrate at a coating weight of 1.4-1.6 g/m$^2$. No primer layer is used. A printable front-side layer is applied to the second side of the polymeric substrate at a coating weight from 0.15 g/m$^2$. The front-side layer comprises on a dry basis 84 wt % of cationic acrylic copolymer (R1117XL from OSP, Owensboro Ky.), 0.8 wt % of crosslinking catalyst (available as Imicure EMI-24 from Air products), 0.4 wt % of glacial acetic acid, 6.7 wt % of Denacol EX-821 cross-linking agent from Nagase Japan, 1 wt % of polyethylene cationic wax (ME09730 from Michelman), 2.5% surfactant (available as Tergitol 15S 9 from Dow Chemical), 0.2% of cross-linked silicone particles (Tospearl T120 from Toshiba Japan), 0.1% of PMMA particles (available as Epostar MA-1004 from Nagase Japan) and 4.3% of acetoacetoxymethylmethacrylate "AAEM" as an adhesion promotor (available from Sigma Aldrich).

Example 1

The white opaque cavitated oriented polypropylene film grade 60LH247 is used as the polymeric substrate. A primer in the form of NeoCryl™ XK-90 is applied at a coating weight of 0.10 (±0.05) g/m² to the side of the substrate intended to receive the backside coating. A backside coating applied over the primer at 1.4-1.6 g/m² comprising 55 wt % kaolinite clays 7005 CS, 34 wt % NeoCryl™ XK-90, and 11 wt % of an ethylene acrylic acid such as Michem® Prime 4990R, available from Michelman Inc., Cincinnati, Ohio (wt %'s being based on the amounts of the backside coating components). The printable polymeric surface layer applied to the opposite side of the substrate is the same as that of Comparative Example 1.

A UV ink is applied to the print face using IGT printing equipment according to industry guidelines. Curing is carried out by exposing ink to a UV lamp. Printing in reel form is conducted by the converter Reynders in Libramont Belgium. The print face ink adhesion is evaluated on aged film in reel form during 1 week at 50° C./50% RH in order to assess absence of cross-contamination with backside coating.

Ink adhesion is tested using a Scotch Magic 810 3M tape allowed to stick against the UV ink for a duration of 10 min before being removed. Ink adhesion is reported in terms of the percentage of ink (in terms of printed surface area coverage) remaining after the tape is removed.

Examples 2-6

The film of Example 1 was substantially reproduced with the relative amounts of the components as shown in Table 1.

Loop tack tests against stainless steel (expressed in g/25 mm) are performed using three different adhesives: a water-based removable adhesive (Acronal 245 A from BASF), a water-based permanent adhesive (Acronal 225 A from BASF), and a solvent-based permanent (Duro tack 180-185A from National). The results are shown below in Table 2. For all examples with WB removable and WB permanent, adhesive failure is noticed. For SB permanent jerking/zipping is noticed.

TABLE 2

| | Loop Tack Performance | | | | | |
|---|---|---|---|---|---|---|
| | WB removable | | WB permanent | | SB permanent | |
| N° | 24 H | 6 days/60° C. | 24 H | 6 days/60° C. | 24 H | 6 days/60° C. |
| CE1 | 580 | 450 | 980 | 975 | 1450 | 1600 |
| Ex. 3 | 600 | 450 | 1000 | 1050 | 1100 | 1380 |
| Ex. 6 | 380 | — | 1000 | — | 1450 | — |

Separate peeling tests on stainless steel on laminated samples with water-based adhesives Acronal 245A and 225A are reported in Table 3 (expressed in g/25 mm)

TABLE 3

| | Peeling Tests on Stainless Steel | | | |
|---|---|---|---|---|
| | WB removable | | WB permanent | |
| N° | 24 H | 6 days/60° C. | 24 H | 6 days/60° C. |
| CE1 | 600 | 800 | 1500 | 1550 |
| Ex. 3 | 600 | 1100 | 1350 | 1750 |
| Ex. 6 | 580 | 1150 | 1550 | 1750 |

Loop tack tests on glass (expressed in N/25 mm) tests comparing the water-based and solvent-based adhesives with a proprietary, industry standard solvent-based adhesive for pharmaceutical uses (designated "SB Pharma") were conducted by Mactac Soignies Belgium are reported in Table 4.

TABLE 1

| | Example Film Compositions | | | | | | | |
|---|---|---|---|---|---|---|---|---|
| | Backside Coating | | | | | | | |
| Example | Inorganic Material (wt %) | Acrylic Emulsion (wt %) | EAA Ionomer (wt %) | Cross-linking Catalyst (AZCote® 5800M (wt %)) | Blocking (vs. Print Face) (g/25 mm) | Humidity resistance* | Ink Adhesion to Backside | Ink Adhesion to Print Face (after Aging) |
| 1 | 7005 CS (55.0) | 43.0 | 11.0 | 0 | 51 | 100% | 61% | 100% |
| 2 | 7005 CS (52.5) | 32.5 | 10.5 | 4.5 | 30 | 100% | 39% | 100% |
| 3 | 7005 CS (48.0) | 34.5 | 13.5 | 4.0 | 31 | 100% | 100% | 100% |
| 4 | SiO₂ W500 + W900 (14.0/14.0) | 34.0 | 34.0 | 4.0 | 33 | 100% | 29% | 100% |
| 5 | SiO₂ W500 + W900 (9.0/9.0) | 32.5 | 46.5 | 3.0 | 38 | 100% | 8% | 100% |
| 6 | SiO₂ W500 + W900 (9.0/9.0) | 46.5 | 32.5 | 3.0 | 29 | 100% | 1% | 100% |

*Humidity resistance is checked by printing backside with a nitrocellulose solvent based ink and rubbing the inked sample 10 times under tap water. The % Humidity resistance is determined from visual inspection of the ink after rubbing.

TABLE 4

Loop Tack Tests on Glass

| N° | WB removable | WB permanent | SB permanent | SB "Pharma" | Hot melt perm |
|---|---|---|---|---|---|
| CE1 | 14.4 | 10.5 | 5.5 | 15.3 | 22.1 |
| Ex. 3 | 12.8 | 12.5 | 4.8 | 16.9 | 23 |
| Ex. 6 | 14.2 | 12.9 | 3.9 | 22.2 | 19.5 |

TABLE 5

Peel tests 180° - 20 min - 300 mm/min - against glass

| N° | WB removable | WB permanent | SB permanent | SB "Pharma" | Hot melt perm |
|---|---|---|---|---|---|
| CE1 | 10.8 | 9.2 | 2.3 | 11.1 | 16. |
| Ex. 3 | 11.8 | 9.3 | 4.1 | 9.3 | 17.1 |
| Ex. 6 | 11.4 | 9.2 | 5.5 | 9.9 | 16.1 |

TABLE 6

Peel tests 180° - 24 H - 300 mm/min against glass (expressed in N/25 mm)

| N° | WB removable | WB permanent | SB permanent | SB "Pharma" | Hot melt perm |
|---|---|---|---|---|---|
| CE1 | 13.9 | 10.3 | 2.6 | 9.8 | 16.2 |
| Ex. 3 | 13 | 11.1 | 6.9 | 10 | 17 |
| Ex. 6 | 12.7 | 11.1 | 6.6 | 11.5 | 16.5 |

TABLE 7

Peel tests at 90° - 20 min - 300 mm/min against glass (expressed in N/25 mm)

| N° | WB removable | WB permanent | SB permanent | SB "Pharma" | Hot melt perm |
|---|---|---|---|---|---|
| CE1 | — | — | 2.1 | 9.9 | 8.6 |
| Ex. 3 | 7.2 | 11.1 | 3.8 | 11.1 | 15.3 |
| Ex. 6 | 8.7 | 10.9 | 4.1 | 11.8 | 12.4 |

TABLE 8

Peel tests at 90° C. - 24 H - 300mm/min against glass (expressed in N/25 mm)

| N° | WB removable | WB permanent | SB permanent | SB "Pharma" | Hot melt perm |
|---|---|---|---|---|---|
| CE1 | — | — | 2.3 | 11.6 | 11.7(AT)* |
| Ex. 3 | 10.5 | 13 | 5.1 | 12.2 | 17.1 |
| Ex. 6 | 12.1 | 13.6 | 5.3 | 12.9 | 13.5 |

(AT)* indicates adhesive transfer to substrate.

Particular Embodiments

1. Particular embodiments include a polymer film comprising:
   a) a polymeric substrate having a first side and a second side;
   b) a back-side coating on the first side of the substrate, the back-side coating formed from at least an ionomer, an acrylic emulsion, and at least a first inorganic material, said inorganic material comprising a majority of particles have a mean largest dimension in the range of 0.2 to 25 μm; and
   c) a polymeric surface layer in contact with the second side of the polymeric substrate.

2. In one embodiment, the film of paragraph 1 includes a back-side coating that further comprises a first cross-linking agent.

3. In particular embodiments of paragraphs 1 or 2, the polymeric surface layer is a printable front-side layer and wherein the back-side coating includes a primer layer positioned in contact with the second side of the polymeric substrate.

4. In one embodiment of the film of paragraph 3, the printable front-side layer comprises a cationic polymer, a second cross-linking agent, a cross-linking catalyst, an adhesion promoter, said first inorganic material comprising particles having a mean largest dimension ranging from about 2.0 μm to about 5.0 μm.

5. In another embodiment, the film according to paragraph 4, the cationic polymer includes at least one cationic acrylate polymer or copolymer, the adhesion promoter comprises acetoacetoxyethylmethacrylate, and wherein the first inorganic material comprises at least one silica, natural clay, or synthetic clay.

6. Films according to the invention include films of paragraphs 1 to 5, wherein the ionomer includes a copolymer comprising: from about 65 wt % to about 95 wt % of polymer units derived from at least one of ethylene, propylene, and butylene; and from about 5 wt % to about 35 wt % of polymer units derived from at least one of acid-group containing comonomer selected from acrylic acid, methacrylic acid, crotonic acid, maleic acid, itaconic acid and mixtures thereof.

7. Particular films according to paragraph 6 include an ionomer including a copolymer comprising from about 65 wt % to about 95 wt % of units derived from ethylene and from about 5 wt % to about 35 wt % of polymer units derived from acrylic acid.

8. Films according to the invention include films of paragraphs 1 to 5, wherein the ionomer comprises: a copolymer comprising from about 50 wt % to about 98 wt % of one or more carbonyl-free monomers selected from the group consisting of styrene, methyl styrene isomers, halogenated styrene isomers, vinyl chloride, vinylidene chloride, butadiene, acrylonitrile, methacrylonitrile, ethylene, propylene, and butylene isomers; and from about 50 wt % to about 2 wt % of one or more of the group consisting of acrylic acid, methacrylic acid, crotonic acid, maleic acid, and itaconic acid.

9. The film of any of paragraphs 1 to 8, wherein the ionomer comprises from about 5 wt % to about 30 wt %, preferably 10 wt % to 20 wt % of the weight of the back-side coating, based on the total weight of the back-side coating of the film.

10. The film of any of paragraphs 1 to 9, wherein the first inorganic material comprises at least one of clay, silica, alumina, titanium dioxide, calcium carbonate, sodium magnesium fluorosilicate, synthetic sodium hectorite, white bentonite, montmorillonite, alkaline polyphosphate, talc, alkaline silicate salts, water glass, surface-treated silica, surface-treated alumina, surface-treated titanium dioxide, surface-treated calcium carbonate, and surface-treated talc.

11. The film of paragraph 10, wherein the alkaline polyphosphate comprises at least one of tetrasodium pyrophosphate, sodium hexametaphosphate, sodium tripolyphosphate, disodium acid pyrophosphate, hexasodium tetra-polyphosphate, and tetrapotassium polyphosphate.

12. The film of any of paragraphs 1 to 11, wherein the particles of the first inorganic material are characterized by a second mean dimension in the range of 0.2 µm to 25.0 µm, wherein the second mean dimension is orthogonal to the largest dimension.

13. The film of any of paragraphs 1 to 12, wherein the polymeric surface layer further includes a second inorganic material having a mean largest dimension in the range of 0.2 µm to 25.0 µm.

14. The film of paragraph 13, wherein the second inorganic material has a mean largest dimension in the range of 1.0 µm to 10.0 µm.

15. The film of any of paragraphs 3 to 14, wherein the primer layer comprises an iminated acrylic, a poly(ethyleneimine), an epoxy, or a polyurethane.

16. The film of paragraph 4, wherein the at least one of the first and second cross-linking agents comprises a carboxyl-reactive cross-linking agent 17. The film of paragraph 6, wherein about 5 wt % to about 35 wt % of the acid groups of acid-group containing comonomer are cross-linked.

18. The film according to any of paragraphs 1 to 17, wherein the first inorganic material comprises from about 15 wt % to about 60 wt % of the back-side coating based on the total weight of the back-side coating.

19. The film according to paragraph 18, wherein the first inorganic material comprises from about 40 wt % to about 60 wt % of the back-side coating, based on the total weight of the back-side coating.

20. The film according to any of paragraphs 2 to 19, wherein the sum of the amounts (in wt %) of the ionomer, acrylic emulsion, and cross-linking agent is ≥ the amount (in wt %) of the inorganic material, based on the weight of the backside coating.

21. The film according to any of paragraphs 2 to 19, wherein the sum of the amounts (in wt %) of the ionomer, acrylic emulsion, and cross-linking agent is < the amount (in wt %) of the inorganic material.

22. A label suitable for labeling an article, the label comprising:
the film of any of the preceding paragraphs 1 to 21.

23. A method of preparing a film, the method comprising the steps of:
coating a first side of a polymeric substrate with a printable front-side coating composition; and
coating a second side of the polymeric substrate with a primer having a back-side coating composition thereon, the back-side coating comprising an ionomer, an acrylic emulsion, and at least one inorganic material, said inorganic material comprising particles having a mean largest dimension in the range of 0.2 µm to 25 µm.

24. A polymer film comprising:
a) a polymeric substrate including a first side and a second side;
b) a back-side coating formed from at least 1) an ionomer comprising from about 65 wt % to about 95 wt % of units derived from ethylene and from about 5 wt % to about 35 wt % of units derived from acrylic acid, the wt % being based on the total weight of the ionomer, 2) an acrylic emulsion, 3) a cross-linking agent, and 4) at least one inorganic material, said inorganic material comprising a majority of particles having a mean largest dimension ranging from 0.2 µm to 25 µm;
c) a primer positioned between the first side of the polymeric substrate and the back-side coating; and
d) a printable front-side layer in contact with the second side of the polymeric substrate, the front-side layer comprising a cationic polymer including at least one cationic acrylate polymer or copolymer, a cross-linking agent, cross-linking catalyst, an adhesion promoter comprising acetoacetoxyethylmethacrylate, and a second inorganic material comprising at least one clay or silica comprising particles having a mean largest dimension ranging from about 2 µm to about 5 µm.

While the invention has been described in detail and with reference to specific embodiments and examples, it will be apparent to one of ordinary skill in the art that various changes and modifications can be made therein without departing from the spirit of the invention. The Examples recited herein are demonstrative only and are not meant to be limiting. Further embodiments are included within the following claims.

The invention claimed is:

1. A polymer film comprising:
a) a polymeric substrate having a first side and a second side;
b) a back-side coating on the first side of the substrate, the back-side coating formed from at least an ionomer, an acrylic emulsion, and at least one inorganic material, said inorganic material comprising a majority of particles having a mean largest dimension in the range of 0.2 µm to 25 µm; and
c) a polymeric surface layer in contact with the second side of the polymeric substrate, wherein the polymeric surface layer is a printable front-side layer, and wherein the back-side coating includes a primer layer positioned in contact with the second side of the polymeric substrate, wherein the printable front-side layer comprises at least one of a cationic polymer, a second cross-linking agent, a cross-linking catalyst, an adhesion promoter, and a second inorganic material, said second inorganic material comprising particles having a mean largest dimension ranging from about 2.0 µm to about 5.0 µm.

2. The film of claim 1, wherein the back-side coating further comprises a first cross-linking agent.

3. The film of claim 1, wherein the cationic polymer includes at least one cationic acrylate polymer or copolymer, the adhesion promoter comprises acetoacetoxyethylmethacrylate, and wherein the first inorganic material comprises at least one silica, natural clay, or synthetic clay.

4. The coated polymer film of claim 1, wherein the ionomer includes a copolymer comprising: from about 65 wt % to about 95 wt % of polymer units derived from at least one of ethylene, propylene, and butylene; and from about 5 wt % to about 35 wt % of polymer units derived from an acid-group containing comonomer selected from the group consisting of acrylic acid, methacrylic acid, crotonic acid, maleic acid, itaconic acid and mixtures thereof.

5. The film of claim 4, wherein the ionomer includes a copolymer comprising from about 65 wt % to about 95 wt % of units derived from ethylene and from about 5 wt % to about 35 wt % of polymer units derived from acrylic acid.

6. The film of claim 1, wherein the ionomer comprises: a copolymer comprising from about 50 wt % to about 98 wt % of one or more carbonyl-free monomers selected from the group consisting of styrene, methyl styrene isomers, halogenated styrene isomers, vinyl chloride, vinylidene chloride, butadiene, acrylonitrile, methacrylonitrile, ethylene, propylene, and butylene isomers; and from about 50 wt % to about 2 wt % of one or more of the group consisting of acrylic acid, methacrylic acid, crotonic acid, maleic acid, and itaconic acid.

7. The film of claim 1, wherein the ionomer comprises from about 5 wt % to about 30 wt %, preferably 10 wt % to 20 wt % of the weight of the back-side coating, based on the total weight of the back-side coating of the film.

8. The film of claim 1, wherein the first inorganic material comprises at least one of clay, silica, alumina, titanium dioxide, calcium carbonate, sodium magnesium fluorosilicate, synthetic sodium hectorite, white bentonite, montmorillonite, alkaline polyphosphate, talc, alkaline silicate salts, water glass, surface-treated silica, surface-treated alumina, surface-treated titanium dioxide, surface-treated calcium carbonate, and surface-treated talc.

9. The film of claim 8, wherein the alkaline polyphosphate comprises at least one of tetrasodium pyrophosphate, sodium hexametaphosphate, sodium tripolyphosphate, disodium acid pyrophosphate, hexasodium tetra-polyphosphate, and tetrapotassium polyphosphate.

10. The film of claim 1, wherein the particles of the first inorganic material are characterized by a second mean dimension in the range of 0.2 μm to 25.0 μm, wherein the second mean dimension is orthogonal to the largest dimension.

11. The film of claim 1, wherein the backside coating further includes a second inorganic material having a mean largest dimension in the range of 0.2 μm to 25.0 μm.

12. The film of claim 11, wherein the second inorganic material has a mean largest dimension in the range of 1.0 μm to 10.0 μm.

13. The film of claim 1, wherein the primer layer comprises an iminated acrylic, a poly(ethyleneimine), an epoxy, or a polyurethane.

14. The film of claim 1, the at least one of the first and second cross-linking agents comprises a carboxyl-reactive cross-linking agent.

15. The film of claim 4, wherein about 5 wt % to about 35 wt % of the acid groups of acid-group containing comonomer are cross-linked.

16. The film according to claim 1, wherein the first inorganic material comprises from about 25 wt % to about 60 wt %, of the back-side coating, based on the total weight of the back-side coating.

17. The film according to claim 16, wherein the first inorganic material comprises from about 40 wt % to about 60 wt % of the back-side coating, based on the total weight of the back-side coating.

18. The film of claim 2, wherein the sum of the amounts (in wt %) of the ionomer, acrylic emulsion, and cross-linking agent is < the amount (in wt %) of the inorganic material, based on the amount of the backside coating.

19. A label suitable for labeling an article, the label comprising: the film of claim 1.

20. A polymer film comprising:
a) a polymeric substrate including a first side and a second side;
b) a back-side coating formed from at least:
   1) an ionomer comprising from about 65 wt % to about 95 wt % of units derived from ethylene and from about 5 wt % to about 35 wt % of units derived from acrylic acid, the wt % being based on the total weight of the ionomer,
   2) an acrylic emulsion,
   3) a cross-linking agent, and
   4) at least one inorganic material, said inorganic material comprising particles having a mean largest dimension ranging from 0.2 μm to 15 μm;
c) a primer positioned between the second side of the polymeric substrate and the back-side coating; and
d) a printable front-side layer in contact with the second side of the polymeric substrate, the front-side layer comprising a cationic polymer including at least one cationic acrylate polymer or copolymer, a cross-linking agent, cross-linking catalyst, an adhesion promoter comprising acetoacetoxyethylmethacrylate, and a second inorganic material comprising at least one clay, silica, or synthetic clay comprising particles having a mean largest dimension ranging from about 2 μm to about 5 μm.

21. A method of preparing a film, the method comprising the steps of:
coating a back-side on a first side of a polymeric substrate to form a back-side coating formed from at least an ionomer, an acrylic emulsion, and at least one inorganic material, said inorganic material comprising a majority of particles having a mean largest dimension in the range of 0.2 μm to 25 μm, wherein the back-side coating includes a primer layer positioned in contact with a second side of the polymeric substrate; and
coating a printable front-side layer with a printable front-side layer composition comprising at least one of a cationic polymer, a second cross-linking agent, a cross-linking catalyst, an adhesion promoter, and a second inorganic material, said second inorganic material comprising particles having a mean largest dimension ranging from about 2.0 μm to about 5.0 μm, wherein the printable front-side layer is a polymeric surface layer and is in contact with the second side of the polymeric substrate.

* * * * *